3,597,512
GRAIN SIZE CONTROL IN REFRACTORY CARBIDES USING HOT PLASTIC STRAINING AND RECRYSTALLIZATION ANNEALING
Joseph M. Tobin and Leonard R. Fleischer, Pittsburgh, Pa., assignors to Westinghouse Electric Corporation, Pittsburgh, Pa.
Filed Mar. 29, 1968, Ser. No. 717,323
Int. Cl. C04b 35/56
U.S. Cl. 264—29                                    9 Claims

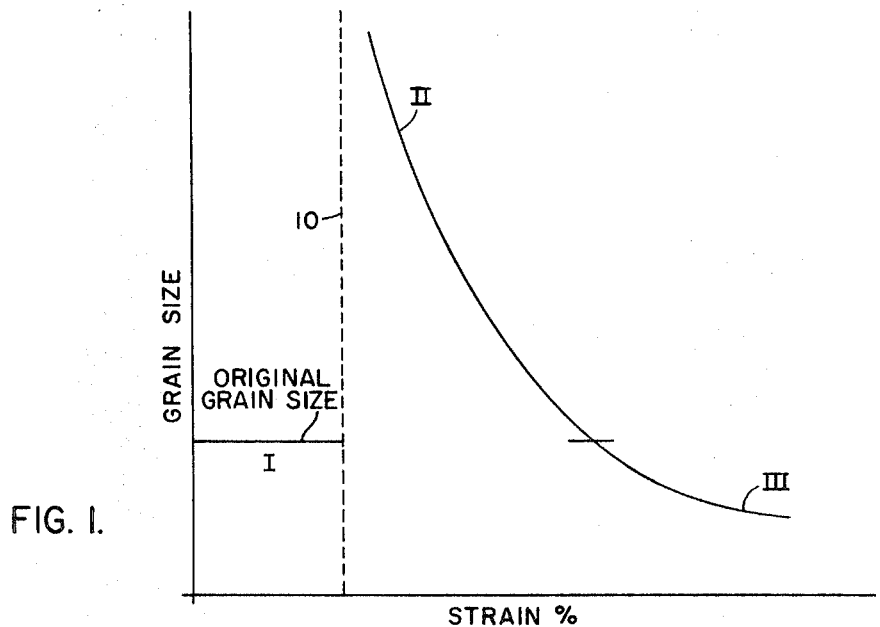
FIG. I.
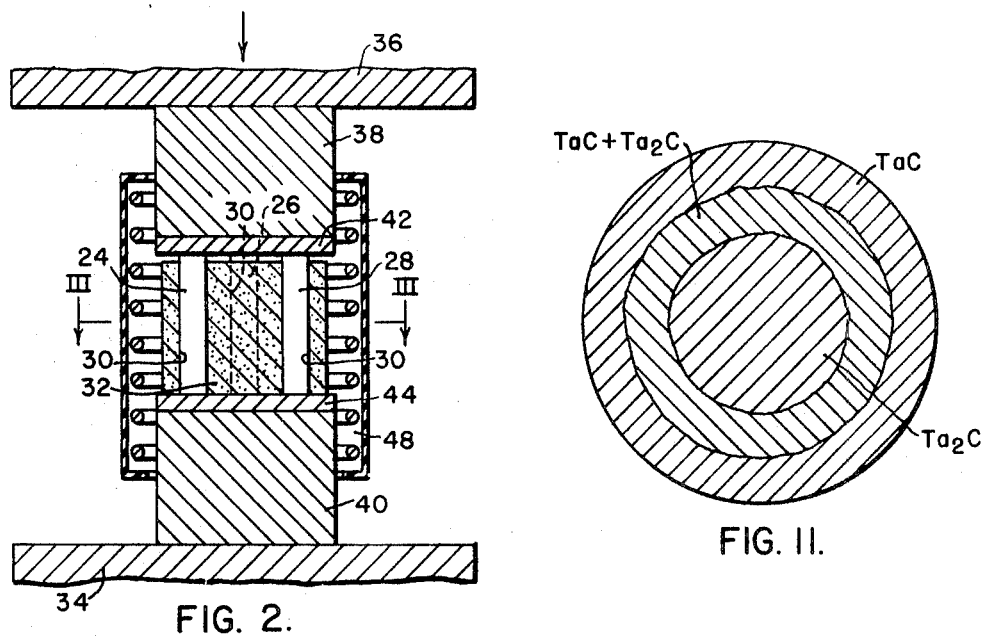
FIG. 2.
FIG. II.
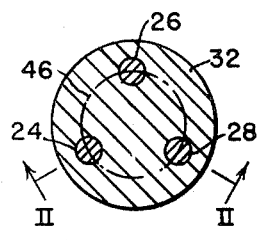
FIG. 3.
INVENTORS
Joseph M. Tobin and
Leonard R. Fleischer
BY
ATTORNEY

United States Patent Office 3,597,512
Patented Aug. 3, 1971

ABSTRACT OF THE DISCLOSURE

A method of controlling the grain size of a refractory metal carbide body comprising recrystallized crystallites of the carbide of a metal of Groups IV–B and V–B of the Periodic Table wherein a body of one or more refractory metal carbides selected from the carbides of the group consisting of Ti, Zr, Hf, V, Nb, and Ta is as an elevated temperature between a point of from about one-half of the melting point of the carbide to a point just below the solidus temperature; and while holding the temperature substantially constant subjecting the carbide to a mechanical strain in an amount equal to at least the critical strain necessary for causing recrystallization of the carbide; removing the stress and annealing the strained body at an elevated temperature in the range of from the straining temperature but not exceeding the solidus temperature (the temperature at which a liquid phase is formed) for a period of time sufficient to cause complete recrystallization of the carbide, whereby the desired recrystallized grain size varies inversely with the amount of strain applied to the carbide.

---

The invention herein described was made in the course of or under a contract or subcontract thereunder with the U.S. Air Force, contract AF 33(615)–3982.

CROSS REFERENCE TO RELATED APPLICATIONS

This invention is related to copending application Ser. Nos. 513,448 (now abandoned) and 660,334; now U.S. Patent No. 3,507,616.

BACKGROUND OF THE INVENTION

Field of the invention

This invention relates to a method for recrystallization of refractory metal carbides in a reproducible and controlled manner to provide a carbide having a desired grain size.

Description of the prior art

Carbides of the metals of Groups IV–B and V–B of the Periodic Table such as titanium, zirconium, hafnium, vanadium, niobium, and tantalum and alloys of two or more of these metals are designated herein as refractory metal carbides.

Carbide crystals of these refractory metals have many applications in industry. The fully dense homogeneous carbide large single crystals will advantageously replace cemented and sintered carbides in many applications. For example, the single crystals of the refractory metal carbides may be used in small diameter wire drawing dies, fine bearings for instruments and gyroscopes, high velocity hydraulic flow control devices, drills, lathe cutting tools, and fiber manufacture devices such as spinnerettes. Heretofore, large single crystals of metal carbide, such as TiC, ZrC, HfC, VC, NbC, and TaC, having high purity and homogeneous composition and structure have been generally unavailable.

The best currently available metal carbide crystals are crystal boules produced by the classical techniques of controlled solidification from a melt. Modifications of the Verneuil method are used in which the end of a growing carbide crystal boule is kept molten while additional metal carbide, usually a fine powder, is sprinkled into the liquid pool. There are characteristic limitations of this technique which affect crystal quality. One limitation is the extremely high temperature required to melt the carbides since the carbides of the transition elements include some of the most refractory substances known. Controlled melting and freezing of liquids at temperatures approaching 4000° C. presents considerable difficulties.

Another shortcoming of the metal carbide crystal boules is the difficulty in controlling the purity and stoichiometric homogeneity of the carbon-metal in a high temperature arc-melted or induction-melted metal carbide liquid. As a result of these limitations, the few crystal carbides currently available are characterized by strains resulting from thermally induced stresses as well as composition and purity variations. For example, it is well known that titanium carbide crystals grown by the arc-melted Verneuil method usually contain inclusions of free carbon, even when the total combined carbon-to-metal ratio is below the stoichiometric proportions for TiC.

The method set forth in Patent No. 3,507,616 provides for the growing of large secondarily recrystallized crystals in a full carbide of a refractory metal, such as the type enumerated above. That method involves the controlled heating of the initial metal body through successive stages of a carbide scale or shell formation and subsequently slowly increasing the temperature of the fully carburized body to a temperature whereby the remaining enclosed pool of liquid metal expands and exerts a stress, resulting in a plastic strain on the confining metal carbide walls after which the fully carburized body is heated at a higher temperature up to but not exceeding the metal carbide-carbon eutectic temperature, so that primary recrystallization occurs by reason of the plastic strain previously incurred in the body and secondary recrystallization produces a large crystal structure. Such a method is more efficient for some refractory metal carbides such as zirconium carbide, than it is for the carbides of other refractory metals.

Experience with metals has indicated that the engineering properties, such as mechanical strength, are dependent upon grain size; the higher strengths being directly related to the finer grain structures. It is anticipated that the same dependence will characterize refractory metal carbides. Therefore, it is desirable to be able to control the grain size of carbides for potential applications at high temperatures. Heretofore this has not been possible.

The present invention constitutes an improvement over the method of Patent No. 3,507,616 in that it is applicable to and has a higher yield of usable single crystal carbides than was possible heretofore. It has been found that carbides of the transition metals may be produced with a desired grain size ranging from large to small size by the application of a controlled mechanical deformation at a critical high temperature and subsequently annealing the body at a higher temperature. The resulting grain size is dependent upon the degree of mechanical deformation or straining. The greater the degree of straining the smaller the grain size. Contrarily, the smaller the percentage of mechanical straining, above a minimum critical amount, the larger the resulting grain size. Correspondingly, intermediate grain sizes may be obtained by the application of intermediate amounts of mechanical strain or deformation.

Accordingly, it is a general object of this invention to provide methods for the controlled recrystallization of carbides of refractory metals.

It is another object of this invention to provide methods of preparing refractory metal carbide crystallites having any desired size either large, very small, or of intermediate size.

Finally, it is an object of this invention to provide bodies of refractory elementary carbides which accomplish the foregoing objects and desiderata in a simple and effective manner.

SUMMARY OF THE INVENTION

Generally, the present invention comprises the steps of providing a metal carbide body of at least one metal of the group consisting of titanium, zirconium, hafnium, vanadium, niobium, tantalum, and alloys of two or more of these metals, mechanically deforming or straining the carbide body, at a fixed temperature equal to at least about one-half of the melting point on the Absolute scale of the carbide but below the solidus temperature until the total strain in the body is at least slightly above the critical strain of the body, terminating the straining, and heating the strained metal carbide body to a temperature between that of straining temperature and the solidus temperature for a sufficient time to cause complete recrystallization of the body, whereby the resulting grain size of the body is dependent upon the degree of strain deformation applied to the body, that is the size of the grain varying inversely with the degree of deformation.

BRIEF DESCRIPTION OF THE DRAWING

For a better understanding of the nature and objects of this invention, reference is made to the drawings, in which similar numerals refer to similar parts in the several views of the drawing, and in which:

FIG. 1 is a graph showing the effect of precent of strain on the recrystallized grain size of a metal carbide;

FIG. 2 s a vertical sectional view through a set of metal carbide specimens mounted for compressive strain in a conventional testing machine and having an induction heating furnace mounted around the specimens;

FIG. 3 is a horizontal sectional view taken on the line III—III of FIG. 2;

FIG. 11 is an enlarged horizontal sectional view through a carbide body of tantalum which forms tantalum monocarbide and bimetal carbide.

DESCRIPTION OF THE PREFERRED EMBODIMENT

Figure 4:
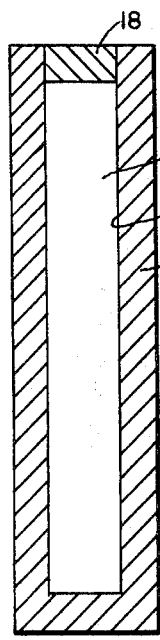
FIGS. 4 to 6 are vertical sectional views of a metal body in a mold showing the progressive changes in the metal to metal carbide transformation from the metal to the carbide stage.

The process of the present invention involves the use of a metal carbide body which may be prepared either by direct reaction of the metal with carbon (such as disclosed in application Ser. No. 513,448, now abandoned), or any other process resulting in a well-annealed carbide body.

The metals of the periodic groups IV–B and V–B, namely titanium, zirconium, hafnium, vanadium, niobium, tantalum, or mixtures or alloys of two or more, form the carbides that are involved herein. The process in addition involves the deformation of straining of the metal carbide body at an elevated temperature, the degree of straining being dependent upon the desired final grain size, after which the body is annealed at a higher temperature in the recrystallization range.

Although plastic strain and recrystallization phenomena have been observed in many metals, recrystallization has been observed only very infrequently in ceramic materials. It has not been previously reported for interstitial compounds such as the carbides, except as disclosed in Patent No. 3,507,616.

The use of a controlled amount of plastic strain before annealing greatly increases the yield of large crystals of a selected size by solid state growth techniques. A small and uniform initial grain size is desirable so that homogetrolled plastic strain and reproducible nucleation occurs during recrystallization in the final stages of the process.

When such a refractory metal carbide is given a controlled plastic strain at a selected critical temperature and annealed to recrystallize it, the recrystallized grain size depends upon the amount of strain as illustrated in the graph in FIG. 1. Three regions of interest have been identified in the graph. Region I is the subcritical strain region in which there is no change in grain size in the annealed carbide from the starting grain size since there is no recrystallization. The effect of a critical amount of strain on the grain size after recrystallization is noticeable with very few new grains grown but they are necessarily large. A typical metal carbide has a critical strain of from about 5 to 12% as indicated by the vertical line 10. Any amount of deformation less than the critical amount of strain as indicated by region I is insufficient to alter the grain size upon subsequent annealing.

Examples of critical strains measured at indicated temperatures are the following:

TABLE I

| Carbide | Temperature, ° C. | | Critical strain, percent |
| --- | --- | --- | --- |
| | Plastic strain | Annealing | |
| ZrC | 2,400 | 2,700 | 7 |
| HfC | 2,500 | 2,900 | 6 |
| TaC | 2,700 | 3,100 | 9 |

However, where the amount of deformation is the critical strain or greater, recrystallization of the metal carbide body occurs on annealing and the resulting grain size is directly dependent upon the amount of strain or deformation above the critical strain percentage.

In region II, an amount of strain or deformation which is either the critical strain or is only slightly greater, results in a recrystallized body upon annealing in which the new grains are relatively large compared to those of the original grain structure. As the amount of strain increases, the resulting grain size decreases. Thus, upon the application of an amount of straining of the body, such as about 25% or more, an annealed grain structure equal to or smaller than that of the original grain size is obtained such as is shown in region III. Accordingly, the desired resulting grain size is substantially inversely dependent upon the amount of strain applied to the carbide body prior to recrystallization.

The process of this invention is carried out by preparing a body of a metal carbide. The metal carbide body may be prepared such as shown in FIG. 4. A metal charge 12 in the form of a solid rod is placed within a chamber 14 of a graphite thimble 16 and an end cap 18 is provided at the upper end of the chamber 14 to completely enclose the metal charge. The assembly of the charge and thimble are then placed in a graphite crucible (not shown) in a manner similar to that as disclosed in Pat. No. 3,507,616, wherein the metal charge 12 is heated at an elevated temperature until it is completely carburized.

Figure 5:
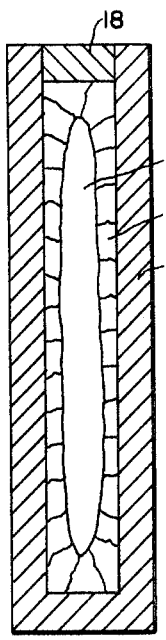
Figure 10:
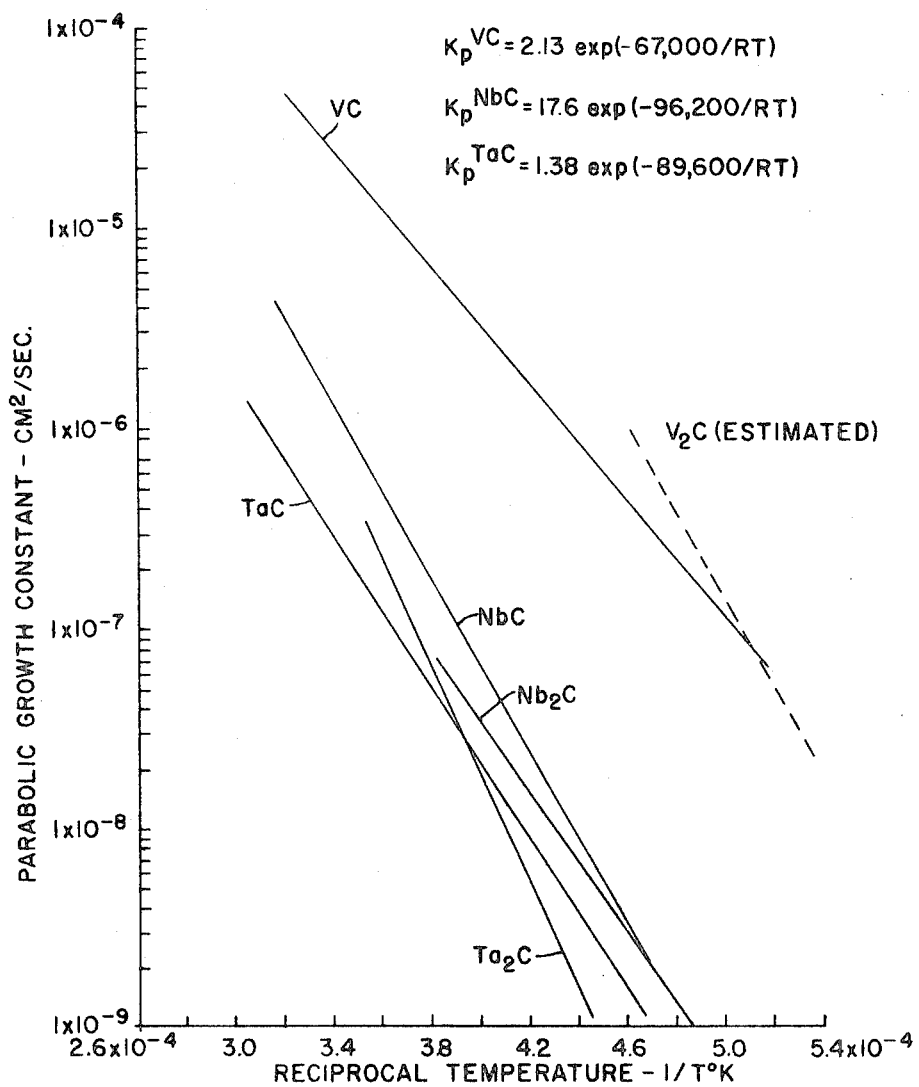
FIG. 10 is a graph showing the parabolic layer growth constant for the growth of the monocarbides and bimetal carbides of vanadium, niobium, and tantalum plotted against the reciprocal of temperature in degrees absolute.

The temperature at which the charge 12 is carburized may be either above or below the melting point of the metal charge. Where it is desirable to form a monocarbide of the metal, the metal charge is preferably heated to a temperature above the melting point because carbon diffusion through the preliminary formed carbide shell 20 as shown in FIG. 5 is faster, and experience has shown that the monocarbides grow better at the higher temperatures. Where however a dimetal carbide, such as formed by the metals of Group V–B ($V_2C$, $Nb_2C$, and $Ta_2C$) is desired, it is preferred to maintain the carbide-forming temperature at a level below the melting temperature of the metal (FIG. 10). The present belief is that the metals of Group IV–B, i.e., titanium, zirconium, and hafnium, do not form dimetal carbides.

The parabolic growth constants as a function of reciprocal temperature for carbides of some transition metals is shown in FIG. 10. Only the metals of Group V–B, namely vanadium, niobium, and tantalum, are shown because they, unlike titanium, zirconium, and hafnium, form dimetal carbides as well as monocarbides. The charge is maintained at a temperature until the metal is completely carburized. The reaction time required for complete carburization is determined by the size of the sample and the growth rate of the reaction product.

The resulting carbide body 22 develops over a period of time depending upon the temperature of carburization of the charge 12. Where the charge is heated in a graphite thimble above the melting point, the temperature is not elevated above the temperature of the metal carbide-carbon eutectic temperature, because above this temperature a liquid phase would form and upon subsequent solidification of two-phase structure of the metal carbide plus graphite would develop. That is, preparation of a single phase carbide rod could not be obtained from two phase structures.

The metal charge 12 is held at the carburization temperature until it is carburized and homogenized. For most purposes a time period ranging from about 24 hours to 100 hours is sufficient. The critical temperatures in various metal-carbon systems for the indicated metals are shown in Table II as follows:

TABLE II.—CRITICAL TEMPERATURES (° C.)

| Element | Melting point | Metal carbide-carbon eutectic temperature |
| --- | --- | --- |
| Titanium | 1,668 | 2,760 |
| Zirconium | 1,857 | 2,890 |
| Hafnium | 2,130 | 3,180 |
| Vanadium | 1,710 | 2,760 |
| Niobium | 2,500 | 3,300 |
| Tantalum | 2,996 | 3,450 |

Figure 6:
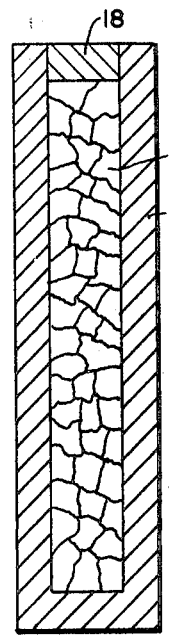

After the carburized and homogenized carbide body is formed (FIG. 6), it is cooled to room temperature and removed from the graphite thimble 16 and is ready for a mechanical straining or deformation.

The foregoing procedure for forming a metal carbide body 22 is preferred for subsequently growing large grains or crystals in the region II of the graph shown in FIG. 1. For that puropse a fully dense, pore-free refractory metal carbide is necessary such as is obtained by the direct reaction process, as is described with respect to FIGS. 4, 5, and 6. Where, however, a very fine grain end product is desirable such as that achieved in the region III of FIG. 1, the refractory metal carbide is preferably prepared by either a sintering or hot-press process. The reason for this is that recrystallized fine-grain carbide materials have superior mechanical properties and are therefore more practical for use in structural applications. It is in this kind of application that it would be most useful to develop a controlled fine-grained structure. Large carbide bodies for these applications are generally prepared by sintering or hot-pressing procedures.

Sintered carbides are prefrably prepared from a fine pure metal powder and carbon mixture, substantially free of contamination of such elements as oxygen, nitrogen, and iron. The compacted mixtures are heated in a nonreactive atmosphere in a conventional manner and the resulting carbides have a high density of above 90%. The sintered carbide bodies are then annealed to reduce residual stresses.

Hot pressed carbide bodies are prepared from the same materials as sintered bodies; i.e., an admixture of fine powders of pure metal and carbon or presynthesized carbide powders. The materials are then pressed at an elevated temperature which is less than the metal carbide-carbon eutectic in dies which are preferably composed of graphite. The pressure ranges from 4000 to 8000 p.s.i.

Generally, the process of straining or deforming the resulting metal carbide body 22 may involve any one of a number of types of deformation including compression, tension, flexure, or ring-type expansion. Compression straining is preferred because it is relatively easy and involves a minimum of preparation of the sample. Compression straining may be performed in any one of a number of conventional mechanical testing machines at an elevated temperature by enclosing the specimen within a resistance furnace attachment. One or more specimens may be strained simultaneously. Good results were obtained by straining three at one time.

Before each specimen is mounted for compression straining the opposite ends are cut or machined to parallel flat planes and the outer surface layer is removed by centerless grinding to provide a preferably cylindrical shape. The original size and shape of the specimen or rod is dependent upon the manner in which the metal carbide body 22 is prepared. Where it is prepared by the carburization procedure as is described with reference to and illustrated in FIGS. 4, 5, and 6, the carburized body may have an original diameter of slightly over 0.30 inch and a length of at least one inch. On the other hand, where the specimen or rod is prepared by sintering or hot pressing the time factor of carbon diffusing from the surrounding mold into the center of the member, is not as critical as in the preceding procedure, for which reason the body prepared by sintering or hot pressing may have a smaller length to diameter ratio. For that reason, specimens or rods prepared by sintering or hot pressing may be compression strained individually to the critical strain without the specimen buckling.

Where specimens are carburized, however, by carbon diffusion from the surrounding mold into the center of the member, it is desirable to compression strain more than one, and preferably three, specimens simultaneously in order to avoid the problem of buckling due to mechanical instability because of the ratio of the axial length to diameter of such specimens, which is often much greater than 1. Inasmuch as the specimens or rods prepared by diffusion have a length to diameter ratio of 4, it is desirable to overcome buckling instability by mounting three such rods in a graphite jig for testing simultaneously. The use of three spaced rods greatly reduces the tendency to buckling.

As indicated above compression straining may be performed on any one of a number of mechanical apparatuses. One such apparatus is shown in FIG. 2, wherein three test rods 24, 26, and 28 are mounted in equally spaced positions (FIG. 3), within rod-receiving chambers 30 in a fixture 32. The fixture 32, with the rods mounted therein, are placed within a compression testing machine having a base member 34 and a vertically compressive member 36 (FIG. 2) between blocks 38 and 40. Platens 42 and 44 are provided at opposite ends of the test rods 24, 26, and 28. In this manner, the diameter of an imaginary circle 46 (FIG. 3) passing through the center axes of the rods 24, 26, and 28 is equal to one half to one times the length of the rods. In this manner, buckling instability of the rods is minimized.

As shown in FIG. 2, the assembly of the several parts is located within a resistance furnace 48 for heating the rods 24, 26, and 28 to the elevated temperature for straining. For that reason, the blocks 38 and 40 are composed of graphite or other refractory material, the platens 42 and 44 having a thickness of about a quarter of an inch are composed of a pyrocarbon material, and the fixture 32 is composed of graphite.

Inasmuch as the monocarbides under consideration are brittle at relatively low temperatures, they must be heated to an elevated temperature which is at least as high as one half the melting point of the metal carbide involved before plastic behavior will occur. The upper temperature limit for straining is the metal carbide-carbon eutectic temperature. Thus, for practical purposes, the range for the straining temperature is about 1400° C. to the metal carbide-carbon eutectic temperature.

The compressive stress applied to the specimens by moving the member 36 (FIG. 2) toward the stationary member 34 of the testing machine, is applied to produce a constant strain rate of to about 0.005 inch per minute, and for a sufficient time to apply the desired amount of strain or deformation in the rods. The preferred rate of applying the compression is about 0.002 inch per minute for the production of large recrystallized grains. Lower strain rates are preferable in the production of fine-grain recrystallized material to avoid modes of strain other than plastic yield at high strain levels. The strain rate may be sufficiently low so that the total strain above 25% may be obtained without cracking, grain boundary separation, or other modes of non-plastic response to strain or failure. These strain rates can be achieved by either the application of a low constant strain rate, or by the application of a constant load giving a stress below the yield stress, to a sufficient strain so that subsequent recrystallization provides grain size control.

Where large grains are desired, a minimum amount of strain is applied to the rods in an amount slightly greater than the critical strain, or percent reduction in length ($\Delta l/l$), which may vary from as low as about 5% to as high as about 12% reduction in length. In other words, the total strain should be equal to or slightly greater than the critical strain for the particular carbide involved. For that purpose, conventional testing machines which are also used for the application of compressive strains have standard strain gauges built into the machines for accurately measuring the amount of strain applied to the samples or test rods.

Inasmuch as the material is strain-rate sensitive, the rates of strain must not exceed the point at which the material ruptures or cracks. For that reason, an average strain rate of about 0.002 C. inch per minute is usually applied.

Figure 7:
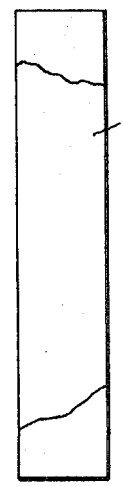
FIG. 7 is an elevational view of a solidified metal carbide member having a large recrystallized grain size.
Figure 8:
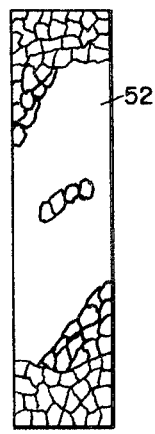
FIG. 8 is an elevational view of another metal carbide member showing a recrystallized fine grain structure after compressive straining and annealing.

Once the critical minimum strain for a material is determined an additional strain may be applied commensurate with the curve shown in FIG. 1 to achieve an ultimate grain size as desired. Accordingly, if a very small additional strain is applied above the critical strain the resulting carbide body 50 (FIG. 7) has very large grains; but the application of an additional strain so as to incur 25% or more strain in the body results in a carbide body 52 (FIG. 8) have a very fine grain structure after annealing.

After the rods are strained to the desired amount, they are cooled to room temperature and removed from the testing machine and are ready for annealing. An alternative to cooling and removing the strained rods from the tensile machine is to remove the load or strain on the rods and continue to heat the rods at the same or a higher temperature to cause recrystallization. The temperatures for annealing may vary from about 1400° C. up to the metal carbide-carbon eutectic temperature for the metal carbide involved. The annealing time may vary from a minimum of about three hours up to about 24 hours.

To produce large-grain or single crystal material heating for the annealing period is performed in such a manner as to optimize the growth of recrystallized nuclei and to minimize further nucleation; such as by slowly heating to the desired annealing temperature.

Conversely, to produce small grain material it is preferable to optimize nucleation and to minimize the growth of nuclei. Therefore, the strained bodies are rapidly heated to the desired annealing temperature.

The details of conditions for the straining and annealing processes conducive to the development of single crystal growth are shown in Table III.

TABLE III

| Carbide | Critical strain by compression, percent | Strain temp., ° C. | Strain rate | Annealing temp., ° C. | Annealing time (hours) |
|---|---|---|---|---|---|
| HfC | 6-6.5 | 2,500 | .002 in./min | 2,900 | 20 |
| TaC | 9-10 | 2,700 | .002 | 3,100 | 6 |
| ZrC | 4.5-5.8 | 2,500 | .002 | 2,700 | 14 |
| Ta$_2$C | 10 | 2,700 | .002 in./min | 2,700 | 8 |

After annealing the rods or bodies at the desired temperature for a time conducive to the desired grain size, the rods are cooled to room temperature and are ready for use. Where single lage grains are involved, they are cut from the rod by a diamond saw. Single crystals may be used to study the fundamental properties of the carbide material such as mechanical, electrical, and thermophysical properties. In addition, single crystals may be used as component parts in various devices such as phonograph needles, wire drawing dies, fluidic devices, lathe and machining tools, textile guides, and instrument bearings.

The following examples illustrate the practice of the invention:

Example I.—Large single crystals of 0.97 HfC—.03 ZrC alloy carbide were produced. These carbide rods having a diameter of 0.25 inch and a length of 1 inch were prepared by the direct reaction technique described above from normal hafnium with 3% zirconium. A set of three rods was strained in compressive loading at a constant strain rate of 0.002 inch per minute at 2500° C. The reduction in length was 6.5% which is slightly greater than the critical strain. The set was cooled to room temperature and transferred to an induction heated furnace and slowly heated over a three hour period to 2900° C. and held fo 20 hours at this annealing temperature. The resulting HfC alloy carbide crystals grew to one inch the full length of the rods for a yield of better than 50% of single crystal rods, based upon repetition of the same procedure.

Example II.—Fine-grained rods of Ta$_2$C were produced by the process upon recrystallization. Rods of Ta$_2$C having a diameter of 0.25 inch and length of 1 inch were prepared by direct reaction of tantalum and carbon in which the reaction time was limited. The resulting three region structure comprised an outer TaC layer, an intermediate two phase layer of TaC and Ta$_2$C, and an inner core of Ta$_2$C is illustrated in FIG. 11. The two outer layers were removed by centerless grinding to yield the Ta$_2$C rods used in this example. The initial grain size of the Ta$_2$C polycrystalline rods was about 0.1 inch. A set of three rods was subjected to a constant compressive load of 10,000 p.s.i. at 2100° C. Over a period of eight hours the rods reduced in length by 7%. The rods were then furnace cooled to room temperature and transfered to an induction heating furnace. The rods were then rapidly heated to 2700° C. in 45 minutes, annealed at temperature for 16 hours, and then furnace cooled to room temperature. The annealing at temperature occured in a TaC crucible rather than graphite to minimize further carburization of the Ta₂C. A thin peripheral layer of TaC was then removed by centerless grinding. The resulting Ta₂C rods were found to have a recrystallized fine grain size of .001 to .020 inch over the entire rod. Approximately 50% of the rods had recrystallized in that manner. The yield was determined by repeating the above procedure.

Example III.—Large single crystals of zirconium carbide were produced. ZrC rods having a diameter of 0.25 inch and a length of 1 inch were prepared by the direct reaction technique. A set of three rods was strained in compressive loading at a constant strain rate of 0.002 inch per minute at 2500° C. The reduction in length was 6.0% which is slightly greater than the critical strain. The set was cooled to room temperature and transferred to an induction heated furnace and slowly heated over a three hour period to 2700° C., and held for 14 hours at this annealing temperature. The resulting ZrC crystals were one inch, the full length of the rods, for a yield of better than 70% based upon repetition of the same procedure.

Example IV.—Large single crystals of tantalum carbide were produced. TaC rods having a diameter of 0.25 inch and a length of 1 inch were prepared by the direct reaction technique. A set of three rods was strained in compressing loading at a constant strain rate of 0.002 inch per minute at 2700° C. The reduction in length was 10.0% which is slightly greater than the critical strain. The set was cooled to room temperature and transferred to an induction heated furnace and slowly heated over a three hour period to 3100° C. and held for 6 hours at this annealing temperature. The resulting TaC crystals were one inch, the full length of the rods for a yield of better than 50%, based upon repetition of the same procedure.

In a similar manner as in Examples I to IV the carbides of Ti, V, and Nb are prepared. Both large bodies of single crystal structure and fine grained structure are produced.

Figure 9:
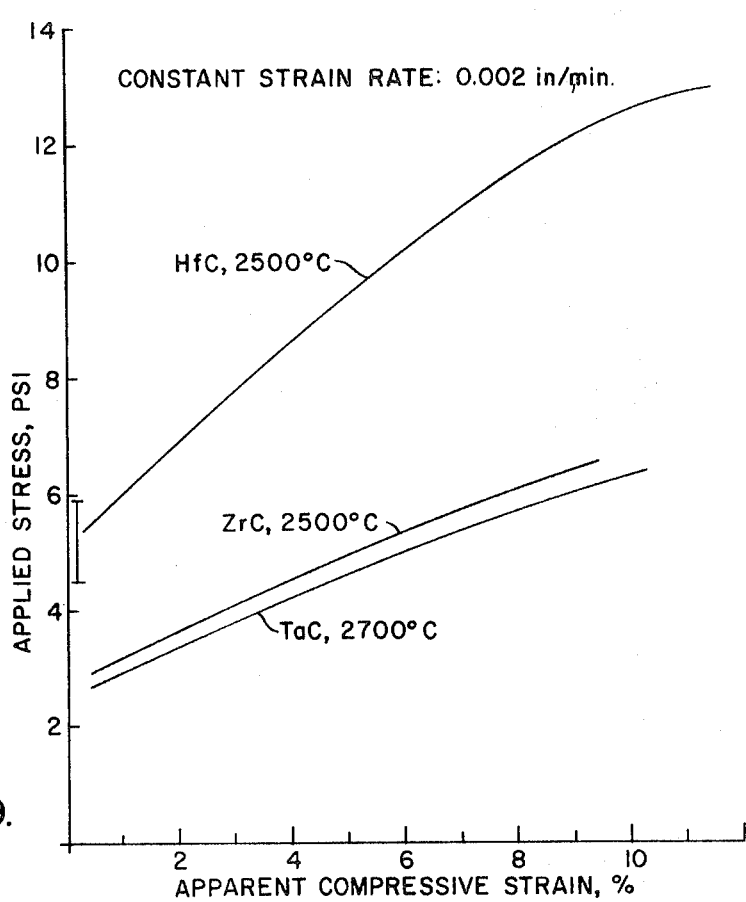
FIG. 9 is a graph showing the effect of constant strain rate compression of carbides at elevated temperatures.

The stresses required to attain some of the desired strain levels are indicated in FIG. 9. These data are all for a constant strain rate of 0.002 inch/min. However, the mechanical behavior of the carbides is dependent on strain rate.

In conclusion, a new process for controlling the grain size of refractory metal carbides has been developed. The process involves the plastic straining by mechanical means of carbide bodies at high temperature and subsequently annealing the strained bodies to achieve crystallization.

The process includes a new and generally more applicable technique for growing large single crystals of refractory metal carbides. Single crystals of a nominal 0.25 inch diameter and 1 inch length have been obtained in yields of over 50% of HfC, ZrC, TaC, and Ta₂C. Crystals resulting from the use of strain-anneal procedure are superior in crystalline perfection to those produced by solidification techniques and those produced by the multiple step process described in Patent No. 3,507,616. After a carbide rod has been given a critical strain in axial compression at very high temperature, a subsequent annealing at a higher temperature causes the growth of very large grains. In principle, these crystals can be grown of alloys of carbides of various carbon compositions within the phase field, of phases of carbides not stable at higher temperatures, and probably of other instititial compounds as well. They can be formed in shapes such as the square cross sectioned VC crystal grown earlier. Finally, the crystals grown by recrystallization can be expected to be free of growth crystal imperfections such as lineage structure.

The process also includes a technique for producing fine-grained refractory metal carbide bodies. Control of the grain size is achieved by applying a large amount of plastic strain by mechanical means to the bodies before annealing; the grain size varies inversely with the amount of strain. Fine-grained carbide bodies have potentially superior mechanical properties as compared to coarse-grained carbides. Therefore, fine-gained carbides are of interest for applications as structural components in high temperature devices.

Finally, intermediate grain sizes can be produced by the application of intermediate strain level and subsequent recrystallization and anneal.

It is understood that the above specification and drawings are exemplary of technically and economically feasible methods for obtaining control of grain size in carbides of refractory metals which was heretofore unobtainable.

We claim as our invention:

1. A method of producing a body of a desired grain size consisting essentially of one or more refractory metal carbides comprising the steps of providing a solid, fully dense metal carbide body of at least one metal of the group consisting of Ti, Zr, Hf, V, Nb, Ta, and an alloy of at least two of these metals, applying a mechanical stress to the body to induce a plastic strain on the solid carbide while the body is at a temperature substantially equal to at least about one half the melting point of the metal on the Absolute scale but below the solidus temperature until the total strain in the body is at least at the critical strain of about 5 to 12% of the body, terminating the stress, annealing the strained metal carbide body at a temperature between that of the straining temperature and the solidus temperature for a sufficient time to cause recrystallization of the body into the desired crystal structure, and cooling to room temperature at a rate sufficiently slow to avoid thermal shock.

2. The method of claim 1 in which the carbide body is strained at a temperature ranging from about 1400° C. up to the solidus temperature.

3. The method of claim 1 in which the carbide body is strained at a rate of up to about 0.005 inch per minute.

4. The method of claim 1 in which the carbide body is strained at about 0.002 inch per minute in longitudinal compression.

5. The method of claim 1 in which the carbide body is strained at a low strain rate sufficiently low to attain a total strain of at least 25% while avoiding non-plastic modes of response to the applied stress, so that subsequent recrystallization results in a finer grain size than the original grain size.

6. The method of claim 1 in which the applied stress is at constant rate.

7. The method of claim 1 in which the carbide body is annealed at a temperature ranging from about 1400° C. up to the temperature of the metal carbide-carbon eutectic.

8. A method of producing a body consisting essentially of one or more refractory metal carbides having at least one large crystal of refractory metal carbide comprising the steps of enclosing with a material consisting essentially of carbon a body of at least one metal of the group consisting of Ti, Zr, Hf, V, Nb, Ta, and an alloy or mixture of at least two thereof, heating the enclosed body while in contact with the material consisting essentially of carbon to a temperature in the range above the melting point of the metal body and below the metal carbide-carbon eutectic temperature for a sufficient time to form a metal carbide body from the metal body, cooling the carbide body to at least below the solidus temperature of the body, applying a mechanical stress to the body to induce a plastic strain on the solid carbide body while it is at a temperature substantially above the temperature equal to half the melting point on the Absolute scale but below the solidus temperature until the total strain in the body is at least the critical strain of about 5 to 12% for the metal carbide body, terminating the stress, annealing the strained metal carbide body at a temperature in the range of the strain temperature up to the solidus temperature of the carbide body for a time of at least 8 hours, and cooling to room temperature at a rate sufficiently slow to avoid thermal shock.

9. A method of producing a body having a fine grain size and consisting essentially of one or more refractory metal carbides comprising the steps of providing a charge of at least one metal of the group consisting of Ti, Zr, Hf, V, Nb, Ta, and an alloy of at least two of these metals, placing the charge in contact with a material consisting essentially of carbonizable material capable of carburizing the metal at an elevated temperature in a range of from slightly below the melting point of the metal charge and below the metal carbide-carbon eutectic temperature of the charge, heating the charge to said elevated temperature for a period of time sufficient to cause formation of a full metal carbide body, cooling the carbide body to at least below the solidus temperature of the body, applying a mechanical stress to the body to induce a plastic strain on the solid carbide body a low rate at a fixed temperature substantially above the temperature equal to one half the melting point on the Absolute scale but below the solidus temperature until the total strain in the body is at least 25%, terminating the stress, annealing the strained metal carbide body by rapidly heating up to a temperature below the solidus temperature of the body for a time of up to 8 hours, and cooling, to room temperature at a rate sufficiently slow to avoid thermal shock.

References Cited

UNITED STATES PATENTS

| | | | |
|---|---|---|---|
| 3,179,723 | 4/1965 | Goeddel | 264—29 |
| 3,320,038 | 5/1967 | Scholz et al. | 106—43 |
| 3,346,681 | 10/1967 | White et al. | 264—29 |
| 3,377,211 | 4/1968 | Schoenfeld | 148—11.5 |
| 3,379,647 | 4/1968 | Smudski | 264—.5 |
| 3,383,737 | 5/1968 | Greger | 264—65 |
| 3,507,616 | 4/1970 | Tobin et al. | 106—43 |

OTHER REFERENCES

John J. Fischer: "Hot-Pressing Mixed Carbides of Ta, Hf, and Zr," an article appearing in the March 1964 issue of Ceramic Bulletin at pp. 183–185.

JULIUS FROME, Primary Examiner

J. H. MILLER, Assistant Examiner

U.S. Cl. X.R.

23—208; 106—43; 264—66, 332